(12) United States Patent
Tsukada et al.

(10) Patent No.: US 6,429,172 B1
(45) Date of Patent: Aug. 6, 2002

(54) METHOD OF MANUFACTURING PSEUDO-BOEHMITE

(75) Inventors: Takayuki Tsukada; Yuji Ohashi; Hideo Segawa, all of Toda (JP)

(73) Assignee: Japan Energy Corporation, Tokyo (JP)

( * ) Notice: Subject to any disclaimer, the term of this patent is extended or adjusted under 35 U.S.C. 154(b) by 0 days.

(21) Appl. No.: 09/402,085

(22) PCT Filed: Jan. 29, 1999

(86) PCT No.: PCT/JP99/00391

§ 371 (c)(1),
(2), (4) Date: Sep. 29, 1999

(87) PCT Pub. No.: WO99/38802

PCT Pub. Date: Aug. 5, 1999

(30) Foreign Application Priority Data

| Jan. 30, 1998 | (JP) | 10-032363 |
| Jun. 28, 1998 | (JP) | 10-232133 |
| Aug. 26, 1998 | (JP) | 10-240212 |

(51) Int. Cl.[7] ............ B01J 32/00; B01J 23/24; B01J 23/74; C01F 7/34; C01F 7/02
(52) U.S. Cl. .......... 502/439; 502/305; 502/315; 502/325; 423/625; 423/626; 423/628; 423/629
(58) Field of Search ............ 423/625, 626, 423/627, 628, 629; 502/439, 305, 325, 315

(56) References Cited

U.S. PATENT DOCUMENTS

| 3,630,670 A | * | 12/1971 | Bell et al. |
| 3,864,461 A | * | 2/1975 | Miller et al. |
| 4,157,382 A | * | 6/1979 | Goodboy et al. |
| 4,265,863 A | * | 5/1981 | Wajc |
| 4,313,923 A | * | 2/1982 | Block et al. |
| 4,505,866 A | | 3/1985 | Oguri et al. |
| 4,666,614 A | * | 5/1987 | Block |
| 4,842,757 A | * | 6/1989 | Reboa et al. |
| 5,516,744 A | * | 5/1996 | Dzombak et al. |
| 5,707,918 A | * | 1/1998 | Wu et al. |

FOREIGN PATENT DOCUMENTS

| JP | 52798 | 1/1977 |
| JP | 58145618 | 8/1983 |
| JP | 5978925 | 5/1984 |

OTHER PUBLICATIONS

Juridical Foundation of Clean Japan Center, "Technology for Processing Waste (Aluminum Hydroxide Sludge) and Reproducing Resource from Waste", Feb. 1981.

* cited by examiner

Primary Examiner—Steven P. Griffin
Assistant Examiner—Christina Ildebrando
(74) Attorney, Agent, or Firm—Birch, Stewart, Kolasch & Birch, LLP

(57) ABSTRACT

Pseudo-boehmite, which is a raw material for a catalyst carrier for hydrogenation refining, is produced by mixing, under a predetermined condition, an aluminate aqueous solution produced from an alkaline etching step for aluminum in an alumite treatment and an acidic aluminum aqueous solution produced from an anodization step for aluminum in the alumite treatment. Pseudo-boehmite can be also produced by maturing, with an alkaline solution, an aluminum hydroxide sludge produced from a washing step for aluminum in the alumite treatment. It is possible to establish a method for producing pseudo-boehmite, which makes it possible to reutilize a resource at extremely low cost by utilizing a treatment waste liquid and a sludge in an alumite treatment site.

19 Claims, 2 Drawing Sheets

METHOD OF MANUFACTURING PSEUDO-BOEHMITE

This application is the national phase under 35 U.S.C. §371 of PCT International Application No. PCT/JP99/00391 which has an International filing date of Jan. 29, 1999, which designated the United States of America.

The present invention relates to a method for manufacturing a pseudo-boehmite powder as a raw material for producing a carrier for a catalyst for hydrogenation refining. In particular, the present invention relates to a method for manufacturing pseudo-boehmite by effectively utilizing waste water and sludge discharged from the aluminum surface-processing steps, and the present invention also relates to a method for producing a catalyst carrier and a method for producing a hydrogenation catalyst.

BACKGROUND ART

In the petroleum refining, a catalyst, in which a metal component having a hydrogenation ability is carried on an alumina carrier, is used as catalyst for hydrogenation refining in many cases. The alumina carrier can be produced by mixing, kneading, and forming a fine powder of pseudo-boehmite as an alumina hydrate, followed by calcination. The pseudo-boehmite powder, which is used as a raw material for the alumina carrier as described above, is produced by using a first method (1) in which an aluminic acid or aluminum salt is formed from gibbsite (aluminum hydroxide) followed by performing a reaction therewith, or a second method (2) in which aluminum alkoxide is hydrolyzed to synthesize the pseudo-boehmite powder. The characteristics of the obtained catalyst are greatly affected by the quality and the characteristics of the alumina carrier and the pseudo-boehmite. Therefore, in general, a high purity aluminum source is used as the raw material of the pseudo-boehmite powder.

When an aluminum product to be used for building materials such as sashes made of aluminum is produced, a treatment is performed in which an aluminum oxide coating forms on the formed aluminum by means of an electrochemical method to improve the corrosion resistance, the abrasion resistance, and the appearance of beauty. This treatment uses a process comprising the steps of, for example, anodization, etching, and washing with water, and it is called the alumite treatment. FIG. 1 shows a series of aluminum surface treatment process including the alumite treatment.

As shown in FIG. 1, the aluminum material is first subjected to the surface degreasing, and it is washed with water. After that, the material is subjected to the alkaline etching step. In the alkaline etching step, the surface of aluminum is dissolved with caustic soda or sodium hydroxide in an amount of several $\mu$m to several tens $\mu$m. Subsequently, the steps of washing with water, neutralization, and washing with water are performed, and then the material is subjected to anodization or an anodic oxidation step. In the anodization, an oxide coating is formed on the surface of the aluminum material in an electrolytic solution such as sulfuric acid. After the anodization, the washing step is further performed with water, optionally followed by coloring and sealing steps to obtain the product.

A large amount of alkaline waste liquid, in which metal aluminum is dissolved at a dense concentration, is produced in the alkaline etching step. In order to effectively utilize the alkaline waste liquid, aluminum hydroxide is deposited from the alkaline waste liquid. On the other hand, the resultant recovery liquid is reused by returning it as caustic soda to the alkali etching step. The deposited aluminum hydroxide has its water concentration of 12 to 15%, and it is a crystalline aluminum hydroxide called gibbsite. This product has been hitherto used as a material for cement and ceramic industries.

In the anodization step described above, an acidic waste liquid (sulfate waste liquid) dissolved with metal aluminum is also produced. In order to treat the acidic waste liquid, diffusion dialysis method has been hitherto used so that sulfuric acid and aluminum sulfate are recovered. In other cases, an alkaline waste liquid, which is produced by the alkaline etching, has been hitherto mixed with the acidic waste liquid to recover aluminum hydroxide.

Further, aluminum dissolved in a washing liquid also exists in the step of washing with water after the alkaline etching and the steps of washing with water before and after the anodization. The washing liquids are gathered and neutralized, followed by solid-liquid separation to obtain sludge or slime containing aluminum hydroxide. The aluminum hydroxide in the sludge has a high water content, and it is an amorphous aluminum hydroxide in a form of gel. Therefore, the aluminum hydroxide sludge has troubles concerning the treatment and disposal. The sludge contains a large amount of other metal components which are components of the aluminum alloy other than aluminum, and it has been hitherto processed by reclamation, or it has been hitherto processed by dissolving it in a by-product of aluminum sulfate. The aluminum sulfate contains colored ions such as those of copper and nickel having been contained in the aluminum alloy. Therefore, the aluminum sulfate is inferior in added value as compared with the high purity aluminum sulfate produced by dissolving gibbsite. As a result, for example, a problem arises in that the aluminum sulfate can be merely used for usage as a neutralizing aggregation treatment agent for processing the waste water.

The effective utilization and the problems, which relate to the waste liquid and the aluminum hydroxide sludge in the alumite processing as described above, are disclosed in detail in "Technology for Processing Waste (Aluminum Hydroxide Sludge) and Reproducing Resource from Waste" issued by the juridical foundation of Clean Japan Center (February, 1981). Factories for processing and treating alumite are present at not less than 1000 sites only in Japan. The amount of produced sludge exceeds 5000 tons per year. Therefore, the waste liquid, which is produced by the alumite processing or treatment, contains a large amount of valuable components. However, in the present circumstances, it is difficult to consider that such valuable components are sufficiently reused. Further, it is demanded to reuse aluminum scrap and aluminum waste produced from the alumite treatment and from other aluminum-processing sites.

DISCLOSURE OF THE INVENTION

An object of the present invention is to provide a method for reproducing a resource from waste, in which a waste liquid or a sludge containing aluminum as described above is utilized as a raw material for producing a catalyst carrier.

Another object of the present invention is to provide a novel process for producing pseudo-boehmite which serves as a raw material for a catalyst carrier. Still another object of the present invention is to provide a method for producing the catalyst carrier and a method for producing a hydrogenation refining catalyst based on the use of the novel process.

Still another object of the present invention is to provide a novel method for treating alumite including the process of effectively utilizing a waste liquid and an aluminum hydroxide sludge produced from the alumite treatment.

According to a first aspect of the present invention, there is provided a method for producing pseudo-boehmite, comprising the steps of dissolving metal aluminum in an acidic or alkaline aqueous solution to prepare an acidic or alkaline aluminum aqueous solution, and producing the pseudo-boehmite from the acidic or alkaline aqueous solution.

As described in the column of the background art, the pseudo-boehmite, which is the material for producing the alumina carrier for the catalyst, is generally produced by forming aluminic acid by using high purity gibbsite as a starting material, and then reacting the obtained product. The present inventors have found out that the pseudo-boehmite can be produced by reacting, under a predetermined condition, the alkaline aqueous solution or the acidic aqueous solution dissolved with a large amount of metal aluminum discharged in a large amount as a waste liquid from the aluminum-processing site such as those for the alumite treatment. The use of this method makes it possible to reuse aluminum as a resource which would be otherwise dealt with as a waste. Further, the use of this method makes it possible to produce, at low cost, the pseudo-boehmite as well as the catalyst carrier and the catalyst based on the use of the same. The method has not been hitherto known, in which the pseudo-boehmite is produced from the starting material of the acidic or alkaline aqueous solution of aluminum obtained by dissolving metal aluminum (metallic aluminum) as described above. In this specification, the phrase "metal aluminum" of the phrase "dissolve metal aluminum" is intended to include oxide or hydrate formed by oxidation of metal aluminum is dissolved.

In order to form the pseudo-boehmite, an acidic aluminum aqueous solution may be mixed with an aluminate aqueous solution obtained from the alkaline aluminum aqueous solution described above. Alternatively, an aluminate aqueous solution may be mixed with the acidic aluminum aqueous solution described above. Those usable as the aluminate aqueous solution include, for example, an aluminate aqueous solution produced from the alkaline etching step for aluminum in the alumite treatment. Those usable as the acidic aluminum aqueous solution include an acidic waste liquid produced from the anodization step for aluminum in the alumite treatment, i.e., an acidic aluminum aqueous solution. The acidic aluminum aqueous solution may contain metal components other than aluminum in a molar ratio of 0.001 to 0.02 with respect to total aluminum contained in the aqueous solution.

Those intended as the metal aluminum may include an aluminum material to be used in the aluminum-processing site such as those for the alumite treatment, because of the following reason. That is, a part of such an aluminum material is dissolved in alkali or acid in the following step such as the etching step to produce the acidic or alkaline aluminum aqueous solution which may serve as the material for producing the pseudo-boehmite.

The material may include an aluminum material used for any usage other than the alumite treatment.

According to a second aspect of the present invention, there is provided a method for producing pseudo-boehmite, comprising the steps of dissolving metal aluminum in an alkaline aqueous solution to prepare an aluminate aqueous solution, dissolving metal aluminum in an acidic aqueous solution to prepare an acidic aluminum aqueous solution, and mixing the prepared aluminate aqueous solution with the prepared acidic aluminum aqueous solution to form the pseudo-boehmite. According to this method, for example, the pseudo-boehmite can be produced only by mixing, under a predetermined condition, the aluminate aqueous solution produced from the alkaline etching step for aluminum in the alumite treatment and the acidic aluminum aqueous solution produced from the anodization step for aluminum in the alumite treatment. Therefore, it is possible to establish an extremely low cost process for producing pseudo-boehmite by utilizing the waste liquid. This process can be carried out in the alumite treatment factory. Accordingly, this process provides the by-product for the alumite treatment factory.

According to a third aspect of the present invention, there is provided a method for producing pseudo-boehmite, comprising the step of maturing or aging, in an alkaline solution, an aluminum hydroxide sludge produced from an alumite treatment. The present inventors have succeeded in producing the pseudo-boehmite only by treating the aluminum hydroxide sludge under a predetermined condition, while being limited to the waste liquid produced from the alumite treatment. According to this method, it is possible to effectively utilize a huge amount of aluminum hydroxide sludge discharged from the aluminum-processing sites existing in Japan as well as all over the world. Especially, when an alkaline waste liquid, which is produced from the alkaline etching step in the alumite treatment, is utilized as the alkaline solution described above, it is possible to produce the pseudo-boehmite in a closed system established at the alumite-processing site. The aluminum hydroxide sludge may be matured, for example, in the alkaline solution at a temperature of 50 to 90° C. under a condition of pH 8 to 12. In general, the aluminum hydroxide sludge is produced from the alkaline etching step for aluminum, and the washing steps performed before and after the anodization step in the alumite treatment.

According to a fourth aspect of the present invention, there is provided a method for treating alumite comprising the steps of alkaline etching for aluminum, anodization, and washing performed thereafter, the method further comprising the step of producing pseudo-boehmite by using an alkaline waste liquid produced from the alkaline etching step, an acidic waste liquid produced from the anodization step, or an aluminum hydroxide sludge produced from the washing step. In the alumite treatment method according to the present invention, the pseudo-boehmite, which serves as a raw material for a catalyst carrier, can be provided as a by-product. Especially, the pseudo-boehmite can be produced in the alumite treatment factory by mixing the alkaline waste liquid produced from the alkaline etching step and the acidic waste liquid produced from the anodization step. In addition to this process, or separately from this process, the pseudo-boehmite may be produced by maturing, in an alkaline solution, the aluminum hydroxide sludge produced from the washing step. The added value may be provided for the alumite treatment factory only by installing, at the alumite-processing site, the equipment for carrying out the process for producing the pseudo-boehmite as described above.

BEST MODE FOR CARRYING OUT THE INVENTION

Figure 1:
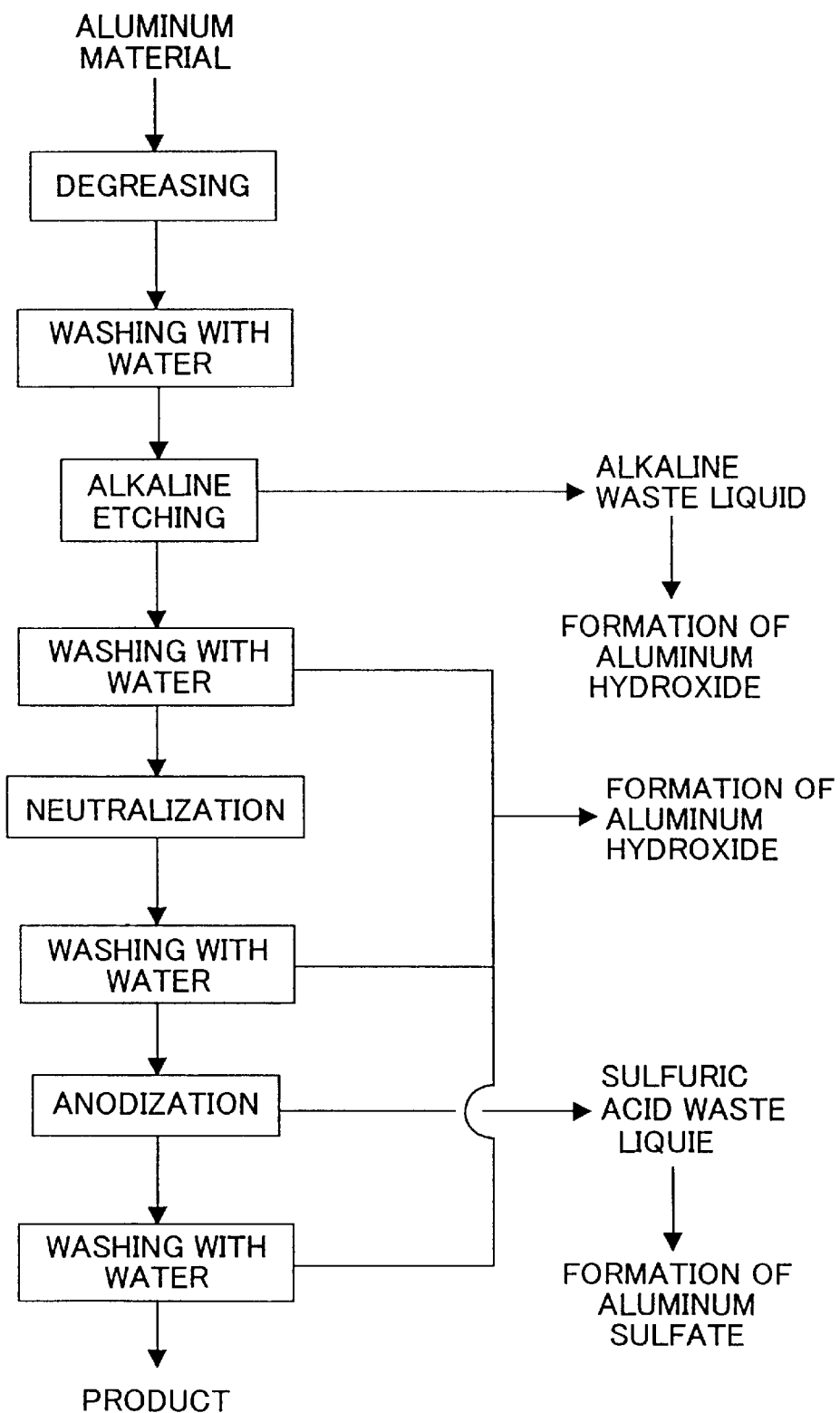
FIG. 1 shows a flow chart illustrating the respective steps of the alumite treatment, depicting the process which results in production of the alkaline waste liquid from the alkaline etching step, the acidic waste liquid from the anodization step, and the aluminum hydroxide sludge from each of the washing steps respectively.

General explanation will be made below for the metal aluminum material to be used for the method for producing the pseudo-boehmite according to the present invention, the method for preparing the aqueous solution dissolved with the same, and the process for producing, from the aqueous solution dissolved with aluminum, the pseudo-boehmite, the catalyst carrier, and the catalyst.

I. Metal Aluminum

Any metal aluminum in any form may be utilized as the metal aluminum. The metal aluminum may be an alloy containing a major component of aluminum, and such metal aluminum may contain aluminum in an amount of, for example, not less than 80%, desirably not less than 90%, and especially desirably not less than 95%. The metal aluminum may be cutting scraps produced during the processing of aluminum, or it may be an aluminum metal content contained in the waste. Accordingly, it is possible to reuse the aluminum resource. A metal aluminum material, which is used for the processing of aluminum such as the alumite treatment, is extremely preferable, because of the following reason. That is, for example, the aluminum metal is eluted into the alkaline solution such as caustic soda in the alkaline etching step in the alumite treatment, and the obtained alkaline waste liquid can be effectively utilized according to the present invention. Further, it is also possible to use the aluminum metal scrap produced in the upstream steps to be performed before the alumite treatment, and the aluminum material used for the usage different from the alumite treatment, for example, the metal aluminum having been used for the cap or the like (aluminum seal attached to the spout) for the drink bottle.

II. Preparation of Alkaline Aqueous Solution of Metal Aluminum

The alkaline dissolution of aluminum is carried out by using an alkaline soda aqueous solution. However, caustic soda (sodium hydroxide) is generally used, for example, because it is easily obtainable. As described above, the alkaline waste liquid, which is produced from the alkaline etching step in the alumite treatment shown in FIG. 1, can be used as it is.

III. Preparation of Aluminate Aqueous Solution

The alkaline solution of metal aluminum is employed as the aluminate aqueous solution to be used to synthesize the pseudo-boehmite powder as it is, or after adjusting the concentration. The appropriate aluminum concentration of the aluminate aqueous solution to synthesize the pseudo-boehmite powder for the catalyst carrier is 0.3 to 6 mol/L, especially 0.5 to 1.5 mol/L. The appropriate molar ratio of alkali/aluminum to synthesize the pseudo-boehmite powder for the catalyst carrier is 1 to 3, especially 1.5 to 2.8. In order to prepare the pseudo-boehmite powder for the catalyst carrier, it is not desirable that the aluminate aqueous solution contains, for example, a large amount of calcium and iron. Therefore, these impurities may be previously removed from the alkaline aqueous solution.

IV. Preparation of Acidic Aqueous Solution and Acidic Aluminum Aqueous Solution Those usable as the acidic aqueous solution include, for example, aqueous solutions of inorganic acids such as sulfuric acid and hydrochloric acid and acidic salts. The acidic aluminum aqueous solution can be prepared by dissolving the metal aluminum described above directly or indirectly, for example, by using an oxide of aluminum in the acidic aqueous solution. It is possible to use aqueous solutions of acidic aluminum salts such as aluminum sulfate and aluminum chloride. It is preferable to use the aluminum sulfate aqueous solution because it is easily obtainable. It is especially preferable to use the acidic waste liquid (i.e., the aluminum sulfate waste liquid) discharged from the anodization step in the alumite treatment shown in FIG. 1, in view of the utilization of the effective resource. The aluminum sulfate aqueous solution may be prepared by dissolving, with acid, the aluminum hydroxide sludge produced from the alumite treatment. It is also desirable to use the aluminum hydroxide sludge from a viewpoint of reutilization of the resource. The aluminum hydroxide sludge is preferable because it is less crystalline, and it has high solubility in acid. It is preferable for the aluminum sulfate aqueous solution to adjust the aluminum concentration to be 0.5 to 2 mol/L.

The acidic aluminum aqueous solution may contain metal components other than aluminum. For example, the acidic aluminum aqueous solution may contain other metals in a molar ratio of 0.001 to 0.02, preferably 0.003 to 0.005 with respect to aluminum contained in the aqueous solution. According to the knowledge of the present inventors, it has been revealed that the pseudo-boehmite powder having a large pore volume and a large specific surface area can be obtained by containing the other metal components in the acidic aluminum aqueous solution. If the content of the other metal components exceeds the range described above, the pore volume of the pseudo-boehmite powder is lowered, which is not desirable. The other metals include, for example, Cu, Ni, Mg, Cr, Mn, Ti, V, Zn, Zr, Be, Ga, Pb, Bi, Sn, Sb, Si, Fe, and lanthanoid.

V. Production of Pseudo-Boehmite Powder

The pseudo-boehmite powder can be produced by mixing the aluminate aqueous solution prepared as described above and the acid aqueous solution or the acidic aluminum aqueous solution described above. Alternatively, the acidic aluminum aqueous solution may be mixed with the alkaline aqueous solution or the aluminate aqueous solution described above.

In order to obtain the pseudo-boehmite powder suitable for the catalyst carrier, the aluminate aqueous solution is mixed with the acid aqueous solution at 40 to 80° C., especially at 55 to 75° C. It is preferable to adjust the mixing ratio of the aqueous solutions so that pH of the mixed solution is 7 to 10, especially 8.0 to 9.5. If the pH is less than 7, it is difficult to filter the pseudo-boehmite powder. On the other hand, if pH exceeds 10, the bayerite tends to be produced.

The obtained pseudo-boehmite powder is filtered and washed with water, and it is used as the material for the catalyst carrier. Further, the pseudo-boehmite powder may be dried after the washing with water for the purpose of transport or the like.

VI. Production of Pseudo-Boehmite from Aluminum Hydroxide Sludge

According to the present invention, the pseudo-boehmite can be also produced from aluminum hydroxide sludge. The method for this purpose will be explained below. Those usable as the aluminum hydroxide sludge include, for example, sludges produced from alumite treatment, an aluminum-processing factory, or an aluminum electrolytic capacitor factory. In general, the aluminum hydroxide sludge contains a major component of aluminum hydroxide having low crystallinity, and it does not exhibit any distinct crystalline structure in the X-ray diffraction pattern.

The aluminum hydroxide sludge is matured as a slurry redispersed in water. The slurry concentration is not specifically prescribed. However, in order to obtain a slurry form which is easily subjected to agitation, it is preferable to contain the solid content of about 1 to 15%, especially 2 to 10%. If the solid content concentration exceeds 15%, then the viscosity is extremely high, and it is difficult to perform agitation. If the solid content concentration is lower than 1%, the productivity of the boehmite is lowered in amount.

Usually, the slurry is neutral. However, even if the maturation is performed by heating the slurry under this condition, the pseudo-boehmite formation merely proceeds at an extremely slow speed, which is not practical. Accordingly, alkali is added to adjust pH of the solution to be weakly alkaline, i.e., 8 to 12. The addition of alkali may be performed either before the heating or after the heating. Alternatively, the aluminum hydroxide sludge may be added to an alkaline aqueous solution. Even when alkali is added before the heating, pH of the solution is lowered during the heating. Therefore, it is necessary to adjust pH after the heating by adding alkali again. Those usable as the alkali for adjusting pH include, for example, ammonia, quaternary ammonium salts such as tetraethylammonium hydroxide, alkaline etching solutions produced in the alumite treatment, alkali aluminate, and alkali hydroxide. Sodium hydroxide is preferred, because it is cheap. From a viewpoint of the reutilization of resource, it is possible to use the alkali waste liquid discharged from the alkaline etching in the alumite treatment. pH to be adjusted during the heating is preferably in a range of 8 to 12, and more preferably in a range of 9 to 11. If the pH is low, the pseudo-boehmite formation proceeds slowly, which is not practical. If the pH is too high, for example, a bayerite phase having a small specific surface area is produced, which is not preferred for the raw material for the catalyst carrier.

The maturation is effected by adjusting the pH to be 8 to 12 while holding the liquid temperature at 50° C. to 95° C., preferably 70° C. to 85° C. If the liquid temperature is less than this range, the pseudo-boehmite formation does not substantially proceeds. If the liquid temperature exceeds this range, the speed of the pseudo-boehmite formation is not changed so much, which results in loss of energy. The maturation time is appropriately about 1 to 24 hours.

After the maturation, the solid matter is separated, for example, by means of filtration with or without cooling. The separated solid matter is suspended in water again, or it is subjected to water passage through the filtrating apparatus so that the alkaline content is washed out by means of washing. The solid matter after the washing can be dehydrated by means of squeezing or air blow to obtain a pseudo-boehmite dehydrated cake. The obtained pseudo-boehmite contains a water content of about 70 to 80%. Therefore, the pseudo-boehmite is dried by using a spray dryer to obtain a powder. Alternatively, the pseudo-boehmite is subjected to adjustment for the water content by using, for example, a mixer type vacuum dryer or a vibrating fluidization dryer. After that, the pseudo-boehmite can be supplied to the next step of producing the carrier.

VII. Characteristics of Pseudo-Boehmite

The pseudo-boehmite is an α-alumina hydrate having extra water molecules in the crystal, and it is represented by $Al_2O_3 \cdot xH_2O$ wherein x is not less than 1 and less than 2. The X-ray diffraction index of boehmite is described in the ASTM card No. 5-0190. The (020) spacing of the pseudo-boehmite for the catalyst carrier is preferably 6.2 to 6.7 angstroms, especially 6.4 to 6.7 angstroms(Å). In general, the crystallite diameter determined from the width of the diffraction peak is 20 to 50 angstroms.

It is possible for the pseudo-boehmite to obtain a higher catalytic activity by giving a specific surface area of 100 to 500 $m^2/g$ as measured by the nitrogen adsorption/desorption method. It is preferable that the pore volume measured by the nitrogen adsorption/desorption method is 0.3 to 1.8 cc/g, especially 0.4 to 1.2 cc/g. If the pore volume is less than 0.3 cc/g, it is difficult to obtain the expected initial activity of the catalyst. If the pore volume exceeds 1.8 cc/g, the mechanical strength of the catalyst carrier is lowered.

The pseudo-boehmite powder may contain metal components other than aluminum in a molar ratio of 0.002 to 0.02, preferably 0.003 to 0.005 with respect to the contained aluminum. However, the impurities in the pseudo-boehmite affect the characteristics of the catalyst. Therefore, the impurities are preferably such that iron is not more than 0.2% by weight, silicon is not more than 1.0% by weight, sodium is not more than 0.2% by weight, calcium is not more than 0.5% by weight, and chlorine is not more than 500 weight ppm.

VIII. Production of Catalyst Carrier

The catalyst carrier can be produced by mixing, kneading, and calcining the pseudo-boehmite. The mixing and kneading process can be performed by using a kneading machine which is generally used for preparing the catalyst. A method is preferably used, in which the water content of the pseudo-boehmite is adjusted, and the mixing operation is performed with a mixing impeller. Usually, when the dry pseudo-boehmite is used, water is added during the mixing and kneading process. However, alcohol or ketone may be added in place of water. The time and the temperature for the mixing and kneading process may be appropriately selected. The mixing and kneading process may be performed while adding, for example, acid such as nitric acid, base such as ammonia, organic compound, binder, ceramic fiber, surfactant, hydrogenation-active component, and zeolite.

The calcination process may be performed after the drying effected at a temperature ranging from ordinary temperature to 150° C., especially 100 to 130° C. The calcination process is preferably carried out at 350 to 800° C. for 0.5 hour or more, especially at 450 to 600° C. for 0.5 to 5 hours. Usually, before the drying step, the pseudo-boehmite is easily formed to have a shape such as a pellet form, a honeycomb form, and a three-leaved form by using an apparatus such as a screw type extruder. Those typically used include shapes such as a spherical form, a columnar form, and a cylindrical form having a diameter of 0.5 to 5 mm.

IX. Characteristics of Catalyst Carrier

The catalyst carrier containing the major component of γ-alumina is obtained by mixing, kneading, and calcining the pseudo-boehmite described above. Components to serve as carrier components other than γ-alumina may be contained in an amount of not more than 20% by weight, especially not more than 10% by weight with respect to the weight of the carrier.

The higher catalytic activity can be obtained for the catalyst when the specific surface area measured by the nitrogen adsorption/desorption method is 50 to 400 m²/g. It is preferable that the pore volume measured by the nitrogen adsorption/desorption method is 0.4 to 1.0 cc/g, especially 0.5 to 0.8 cc/g. If the pore volume is less than 0.4 cc/g, it is difficult to obtain the expected initial activity of the catalyst. If the pore volume exceeds 1.0 cc/g, the mechanical strength of the catalyst is lowered.

X. Hydrogenation Refining Catalyst

The catalyst carrier described above is allowed to carry a metal component having the hydrogenation activity to prepare the catalyst for hydrogenation refining. Those usable as the metal component having the hydrogenation activity to be carried include at least one metal element selected from metal elements belonging to the group VI, the group IX, and the group X of the periodic table. It is preferable to use any one of or both of at least one of the metal elements belonging to the group VI of the periodic table, especially molybdenum and tungsten, and at least one of the metal elements belonging to the group IX or the group X of the periodic table, especially nickel or cobalt. It is preferable that these elements are contained in the carrier in a state of metal, oxide, or sulfide. It is also possible to carry, for example, oxide or sulfide of phosphorus, other than the metal component having the hydrogenation activity.

The metal components may be appropriately carried by means of the impregnating method to be ordinarily used, including, for example, known methods such as the pore-filling method, the heating impregnating method, the vacuum impregnating method, the immersing method, and the mixing and kneading method. Typically, the carrier is impregnated with an aqueous solution containing the metal component having the hydrogenation activity, followed by drying and calcination. Thus, the metal component can be carried on the carrier. In this procedure, those preferably used as the metal element belonging to the VI group are provided as aqueous solutions of compounds such as ammonium paramolybdate, paramolybdic acid, ammonium molybdate, phosphomolybdic acid, ammonium tungstate, tungstic acid, tungstic acid anhydride, and phosphotungstic acid. Those preferably used as the metal element belonging to the IX group or the X group are provided as aqueous solutions of compounds such as nitrate, sulfate, chloride, fluoride, bromide, acetate, carbonate, and phosphate of nickel or cobalt.

The amount of the metal component to be carried is preferably as follows with respect to the weight of the catalyst in view of the hydrogenation refining activity such as those for desulfurization and denitrification. That is, the metal element of the group VI is 1 to 15% by weight, especially 5 to 10% by weight as calculated as metal in the total amount. The metal element of the group IX or the group X is 0.5 to 5% by weight, especially 1 to 3% by weight as calculated as metal in the total amount. The metal component may be also carried by adding, mixing, and kneading the metal component during the process for mixing and kneading the pseudo-boehmite.

Explanation will be made below for Examples in which the method of the present invention is specifically carried out.

EXAMPLE 1

Example 1 is illustrative of a case to carry out the method for producing the pseudo-boehmite from the alkaline aluminum aqueous solution according to the first aspect of the present invention. Example 1 is representative of a model experiment as well illustrating the fact that the pseudo-boehmite can be produced from the alkaline waste liquid in the alumite treatment illustrated in FIG. 1.

Metal aluminum was dissolved in a caustic soda aqueous solution to prepare an aqueous aluminate solution. The aluminum concentration of this solution was 1.0 mol/L, and the molar ratio of sodium/aluminum was 2.5. The aluminate aqueous solution and aluminum sulfate having an aluminum concentration of 1.0 mol/L were continuously poured into a vessel while performing agitation to mix them. The pouring amounts of these solutions were adjusted so that the temperature of the liquid was 60° C. and pH was 9.0 during the mixing process. The mixing operation was continued for 13 minutes to obtain a mixed solution of 500 liters. The mixed solution was left to stand for 30 minutes, and then an obtained slurry was filtrated and washed to obtain a solid matter which was dried by using a spray dryer to obtain a pseudo-boehmite powder.

It was confirmed by the X-ray diffraction that the obtained pseudo-boehmite powder had a structure of pseudo-boehmite. The pseudo-boehmite powder had a specific surface area of 463 m²/g and a pore volume of 1.2 ml/g.

The boehmite powder was added with 3.25% by weight of nitric acid to start the mixing and kneading process. The mixing and kneading operation was performed for 2 hours while adding water. The mixture was shaped to have a columnar configuration having a diameter of 0.8 mm and a length of 3 to 5 mm by using an extruder. After drying, the calcining operation was performed at 600° C. for 1 hour by using a rotary kiln to obtain an alumina carrier. It was confirmed by the X-ray diffraction that the obtained alumina carrier had a structure of γ-alumina. The γ-alumina carrier had a specific surface area of 284 m²/g, a pore volume of 0.77 ml/g, a central pore diameter of 93 angstroms, and a lateral crushing strength of 3.7 kg.

Subsequently, the obtained γ-alumina carrier was allowed to carry 8.0% by weight of molybdenum and 2.2% by weight of nickel to produce a desulfurization catalyst for hydrogenation refining. The catalyst had a specific surface area of 260 m²/g, a pore volume of 0.62 ml/g, a central pore diameter of 88 angstroms, and a lateral crushing strength of 3.4 kg.

The desulfurization activity was tested for the obtained catalyst by using a raw material oil of Arabian light crude oil (specific gravity: 0.9608 kg/L, sulfur content: 3.32% by weight) under conditions of reaction temperatures of two points of 360° C. and 380° C., a reaction pressure of 12 MPa (hydrogen pressure), a liquid space velocity of 2.0 hr⁻¹, and a supply ratio (H₂/Oil) between the hydrogen gas and the raw material oil of 500 L/L. The obtained refined oil was analyzed for the sulfur content. As a result, the sulfur content was 0.70% by weight for the refined oil refined at 360° C. and 0.36% by weight for the refined oil refined at 380° C. These values are equivalent to those of the desulfurization activity of the commercially available desulfurization catalyst prepared by using a raw material of a high purity pseudo-boehmite powder based on the alkoxide method (0.70% by weight for the oil produced at 360° C. and 0.38% by weight for the oil produced at 380° C.).

It has been demonstrated from Example 1 that the pseudo-boehmite can be produced by using the waste liquid from the alkaline etching step in the alumite treatment. Further, it has been revealed that the catalyst for hydrogenation refining produced from the obtained pseudo-boehmite has the good performance.

EXAMPLE 2

The method is carried out for producing the pseudo-boehmite from the acidic aqueous aluminum solution according to the first aspect of the present invention. Example 2 is representative of a model experiment as well illustrating the fact that the pseudo-boehmite can be produced by using the acidic waste liquid produced from the anodization step in the alumite treatment shown in FIG. 1.

Those prepared as samples were four acidic aluminum solutions obtained by adding sulfates of copper, nickel, magnesium, and iron to an aluminum sulfate aqueous solution having an aluminum concentration of 1.0 mol/L respectively, and an aluminum sulfate aqueous solution having an aluminum concentration of 1.0 mol/L added with nothing. These acidic aluminum solutions were prepared while assuming the acidic waste liquid containing various metals produced from the anodization in the alumite treatment. The amounts of addition of the respective metals are shown in Table 1 as expressed by molar ratios with respect to aluminum. An aluminate aqueous solution having an aluminum concentration of 1.0 mol/L and a molar ratio of sodium/aluminum of 1.6 was prepared as the alkaline aluminum solution.

TABLE 1

| Added metal | Cu | Ni | Mg | Fe | None |
|---|---|---|---|---|---|
| Added amount (molar ratio) | 0.0035 | 0.0038 | 0.0044 | 0.0037 | 0 |
| Specific surface area ($m^2/g$) | 389 | 377 | 390 | 369 | 374 |
| Pore volume (ml/g) | 0.81 | 0.75 | 0.74 | 0.74 | 0.67 |
| Central pore diameter (angstroms) | 74 | 71 | 68 | 70 | 64 |

The acidic aluminum solution and the alkaline aluminum solution were continuously poured into a vessel while performing agitation to mix them. The pouring amounts of the respective solutions were adjusted so that the temperature of the liquid was 60° C. and pH was 9.0 during the mixing process. The mixing operation was continued for 10 minutes to obtain a mixed solution of 1 L. The mixed solution was left to stand for 30 minutes, and then an obtained slurry was filtrated and washed to obtain a solid matter. The solid matter was dried at 80° C. for 12 hours by using hot air, followed by pulverization to obtain a pseudo-boehmite powder having an aggregation grain diameter of not more than 250 μm.

The obtained pseudo-boehmite powder was confirmed to have a structure of pseudo-boehmite according to the X-ray diffraction. Table 1 shows the features of the five pseudo-boehmite powders obtained from the respective acidic aluminum solutions. It is understood that the specific surface area and the pore volume are increased when the other metal of 0.0035 to 0.0044 mole is added, as compared with the sample in which no metal is added.

Subsequently, a boehmite powder added with 0.0035 mole of Cu with respect to 1 mole of aluminum, and a boehmite powder added with no other metal were prepared as follows. A sample was prepared in which copper sulfate was added in an amount of 0.0035 mole per 1 mole of aluminum to an aluminum sulfate aqueous solution having an aluminum concentration of 1.0 mol/L, and a sample was prepared in which no copper sulfate was added. An aluminic acid aqueous solution having an aluminum concentration of 1.0 mol/L and a molar ratio of sodium/aluminum of 1.6 was prepared as the alkaline aluminum solution.

The acidic aluminum solution and the alkaline aluminum solution were continuously poured into a vessel while performing agitation to mix them. The pouring amounts of the respective solutions were adjusted so that the temperature of the liquid was 60° C. and pH was 9.0 during the mixing process. The mixing operation was continued for 17 minutes to obtain a mixed solution of 500 L. The mixed solution was left to stand for 30 minutes, and then an obtained slurry was dried by means of the spray drying procedure to obtain a pseudo-boehmite powder. The features of the obtained pseudo-boehmite powder are shown in Table 2.

TABLE 2

| Added metal | Cu | None |
|---|---|---|
| Added amount (molar ratio) | 0.0035 | 0 |
| Characteristics of pseudo-boehmite: | | |
| Specific surface area ($m^2/g$) | 404 | 390 |
| Pore volume (ml/g) | 0.99 | 0.93 |
| Central pore diameter (angstroms) | 93 | 89 |
| Characteristics of carrier: | | |
| Specific surface area ($m^2/g$) | 310 | 300 |
| Pore volume (ml/g) | 0.78 | 0.72 |
| Central pore diameter (angstroms) | 89 | 85 |
| Lateral crushing strength (kg) | 4.5 | 3.3 |

Carriers were prepared by using the obtained pseudo-boehmite powder added with copper and the obtained pseudo-boehmite powder added with no copper respectively. In each case, 3.0% by weight of nitric acid was added to the boehmite powder to start the mixing and kneading process. The mixing and kneading operation was performed for 2 hours while adding water. The mixture was shaped to have a columnar configuration having a diameter of 0.8 mm and a length of 3 to 5 mm by using an extruder. After drying, the calcining operation was performed at 600° C. for 1 hour by using a rotary kiln to obtain an alumina carrier. It was confirmed by the X-ray diffraction that the obtained alumina carrier had a structure of γ-alumina. The characteristics of the respective carriers are shown in Table 2 as well. It is understood that when copper is added, then the pore volume of the carrier is increased, and the lateral crushing strength is improved.

It has been demonstrated from Example 2 that the pseudo-boehmite can be produced by using the acidic waste liquid produced from the anodization step in the alumite treatment. Especially, it has been revealed that even when the metal other than aluminum is contained in the acidic waste liquid, the production of the pseudo-boehmite is not badly effected thereby provided that the metal other than aluminum is at a predetermined amount level. Further, it has been revealed that even when the metal other than aluminum is contained in the acidic waste liquid, it is possible to obtain the catalyst carrier having the large pore volume and the large breaking strength.

EXAMPLE 3

In Example 3, the method for producing the pseudo-boehmite according to the second aspect of the present invention is carried out. Example 3 is representative of a model experiment as well as illustrating the fact that the pseudo-boehmite can be produced by using the alkaline waste liquid produced from the alkaline etching step and the acidic waste liquid produced from the anodization step in the alumite treatment.

i) EXAMPLE 3A

A metal aluminum material to be used for the alumite treatment was employed as the metal aluminum, and it was dissolved in a sodium hydroxide aqueous solution heated to about 60° C. and in a dilute sulfuric acid solution respectively to prepare sodium aluminate and aluminum sulfate respectively. In this process, the precipitated undissolved components were removed, and only the supernatant was used as a sample. Example A in Table 3 shows the components in the sample solutions of sodium aluminate and aluminum sulfate respectively. As shown in Table 3, the sodium aluminate contained Si as an impurity. The aluminum sulfate contained trace amounts of Si, Fe, Ni, Cu, and Mg. It is considered that these metal components were contained in the metal aluminum.

drying, calcination was performed at 450° C. to prepare a desulfurization catalyst. The catalyst thus obtained is called CAT SA.

The pseudo-boehmite powder obtained as described above was mixed with 1.0% aqueous ammonia followed by mixing and kneading to perform extrusion forming so that a three-leaved configuration was given thereby. Subsequently, calcination was performed at 800° C. to obtain a γ-alumina carrier. The γ-alumina carrier was subjected to the same treatment as that described above so that Mo was 6% by weight and Ni was 1.5% by weight. Accordingly, a demetalization catalyst was obtained. The catalyst thus obtained is called CAT MA.

ii) EXAMPLE 3B

Sample solutions of sodium aluminate and aluminum sulfate were prepared respectively in the same manner as in Example 3A except that a metal aluminum material different from the metal aluminum material used in Example 3A was used. Example B in Table 3 shows impurities contained in the respective solutions. Subsequently, the sodium aluminate solution and the aluminum sulfate solution were heated

TABLE 3

|  | Example A | | Example B | | Commercially available products | |
| --- | --- | --- | --- | --- | --- | --- |
|  | $Na_3AlO_3$ | $Al_2(SO_4)_3$ | $Na_3AlO_3$ | $Al_2(SO_4)_3$ | $Na_3AlO_3$ | $Al_2(SO_4)_3$ |
| Al (Mol/l) | 1.03 | 1.90 | 0.93 | 1.41 | 5.93 | 1.52 |
| Na/Al | 2.54 | 0.011 | 2.61 | — | 1.54 | <0.01 |
| $SO_4$/Al | — | 1.75 | — | 1.94 | — | 1.50 |
| Si/Al | 0.0039 | 0.0121 | 0.0054 | 0.0038 | <0.001 | <0.001 |
| Fe/Al | <0.001 | 0.0026 | <0.001 | 0.0061 | <0.001 | <0.001 |
| Ni/Al | <0.001 | 0.0011 | <0.001 | 0.0024 | <0.001 | <0.001 |
| Cu/Al | <0.001 | 0.0011 | <0.001 | 0.0014 | <0.001 | <0.001 |
| Mg/Al | <0.001 | 0.0074 | <0.001 | 0.0213 | <0.001 | — |

The sodium aluminate solution was heated to 60° C. without dilution. The aluminum sulfate solution was heated to 60° C. after being diluted so that the aluminum concentration was 1 mol/L. These solutions were added to 300 liters of water having been heated to 60° C. to produce the precipitate. The sodium aluminate solution was added at a speed of about 4.6 liters/minute. The aluminum sulfate solution was added at a speed of about 3.8 liters/minute. The addition was continued for about 22 minutes. However, the adding speeds of the both solutions were finely adjusted so that pH of the slurry was maintained at 9.0. The obtained slurry was matured for 30 minutes while performing agitation at a temperature of 60° C. After that, the slurry was filtered by using a filter press, and about 800 liters of deionized water was allowed to pass therethrough to wash and remove the sodium sulfate content. The solid matter was washed, and then it was squeezed with pneumatic pressure to obtain a dehydrated cake. Water was added to the cake to obtain a slurry which was subsequently dried by using a spray dryer to obtain a pseudo-boehmite powder.

The obtained powder was mixed with 3.25% dilute nitric acid, and it was sufficiently mixed and kneaded while adding water so that the water content was about 55%, followed by extrusion forming to give a columnar configuration. The formed product was dried at 120° C., followed by calcination at 700° C. to obtain a γ-alumina carrier. The carrier was impregnated with an ammonium molybdate solution and a nickel nitrate solution so that 8% by weight of Mo and 2.2% by weight of Ni were carried thereby respectively. After to 60° C. without dilution. These solutions were added to 300 liters of water having been heated to 60° C. to produce the precipitate. The sodium aluminate solution was added at a speed of about 4.5 liters/minute. The aluminum sulfate solution was added at a speed of about 2.2 liters/minute. The addition was performed for about 22 minutes. However, the adding speeds of the both solutions were finely adjusted so that pH of the slurry was maintained at 9.0. The obtained slurry was treated in the same manner as in Example 3A to obtain a desulfurization catalyst. The catalyst thus obtained is called CAT SB.

iii) COMPARATIVE EXAMPLE

A commercially available pseudo-boehmite powder (Fe: 94 ppm, Si: 40 ppm, Ti: 100 ppm) having high purity produced by the hydrolyzing method for aluminum alkoxide was prepared. Dilute nitric acid was added to the powder, and the treatment was performed in accordance with the same method as performed in Example 3A to prepare a desulfurization catalyst. The catalyst thus obtained is called CAT SC.

A commercially available sodium aluminate solution (produced by Showa Denko, K. K.) and a solid aluminum sulfate preparation (produced by Nippon Light Metal Co., Ltd.) having the compositions shown as "Commercially available products" in Table 3 were dissolved in water to obtain solutions which were used to perform dilution so that the Al concentration was 1 mol/L. A pseudo-boehmite powder was synthesized in the same manner as in Example 2. Subsequently, an alumina carrier and a demetalization catalyst were obtained from the powder. The obtained catalyst is called CAT MD.

Desulfurization Activity Test

The hydrogenation desulfurization reaction was performed under the conditions 1 and 2 shown in Table 5 with the catalyst prepared in Examples 3A and 3B by using a material oil of atmospheric residual oil originating from the Middle East shown in Table 4 to analyze the S component remaining in the refined oil. Obtained results are shown in Table 6. The desulfurization activity equivalent to that of the catalyst CAT SC prepared from the commercially available high purity boehmite of Comparative Example was exhibited by the catalysts CAT SA and CAT SB prepared from the pseudo-boehmites synthesized with the solutions dissolved with the metal aluminum containing various impurities prepared in Examples 3A and 3B.

TABLE 4

|  | Atmospheric residual oil originating from Middle East | Mixed oil of atmospheric residual oil originating from Middle East/vacuum residual oil |
|---|---|---|
| Specific gravity (15° C.) | 0.9608 | 1.0278 |
| S (wt %) | 3.32 | 5.64 |
| V (wt ppm) | 38 | 130 |
| Ni (wt ppm) | 10 | 179 |

TABLE 5

|  | Condition 1 | Condition 2 | Condition 3 |
|---|---|---|---|
| Reaction pressure (MPa) | 12 | 14 | 14 |
| Hydrogen/material oil ratio (L/L) | 1000 | 1000 | 670 |
| Liquid space velocity ($hr^{-1}$) | 1.0 | 0.5 | 1.0 |
| Reaction temperature (° C.) | 380 | 390 | 380 |

TABLE 6

| Condition<br>Material oil | Condition 1:<br>Atmospheric residual oil originating from Middle East<br>S (wt %) in produced oil after 6 hours | Condition 2:<br>Mixed oil of atmospheric residual oil originating from Middle East/vacuum residual oil<br>S (wt %) in produced oil after 550 hours |
|---|---|---|
| CAT SA (Example) | 0.38 | 0.92 |
| CAT SB (Example) | 0.37 | — |
| CAT SC (Comparative Example) | 0.38 | 0.93 |

Demetalization Activity Test

The mixed oil of the atmospheric residual oil originating from the Middle East/the vacuum residual oil shown in Table 4 was used as the raw material oil, and the hydrogenation demetalization reaction was performed under the condition 3 shown in Table 5 to analyze the V component and the Ni component remaining in the produced oil. Obtained results are shown in Table 7. The demetalization activity equivalent to that of the catalyst CAT MD prepared by using the pseudo-boehmite synthesized from the commercially available high purity solutions as described in Comparative Example was exhibited by the catalyst CAT MA prepared from the pseudo-boehmite synthesized with the solutions dissolved with the metal aluminum containing various impurities prepared in Examples 3A and 3B.

TABLE 7

|  | Condition 3:<br>Mixed oil of atmospheric residual oil originating from Middle East/vacuum residual oil<br>In produced oil | |
|---|---|---|
| Condition<br>Material oil | V (wt ppm) | Ni (wt ppm) |
| CAT MA (Example) | 44 | 27 |
| CAT MD (Comparative Example) | 46 | 28 |

According to the results described above, it has been revealed that the pseudo-boehmite can be synthesized by using the acidic aqueous solution and the alkaline aqueous solution dissolved with the metal aluminum respectively, for example, the alkaline waste liquid produced in the etching step and the acidic waste liquid produced in the anodization step in the alumite treatment. Further, it has been also revealed that the catalyst equivalent to the catalyst produced by using the commercially available boehmite or the pseudo-boehmite prepared from the commercially available raw material solutions can be prepared by using the pseudo-boehmite according to the present invention.

EXAMPLE 4

Example 4 is illustrative of the method for producing the pseudo-boehmite by using the aluminum hydroxide sludge produced from the washing steps in the alumite treatment illustrated in FIG. 1.

i) Production of Pseudo-boehmite

Figure 2:
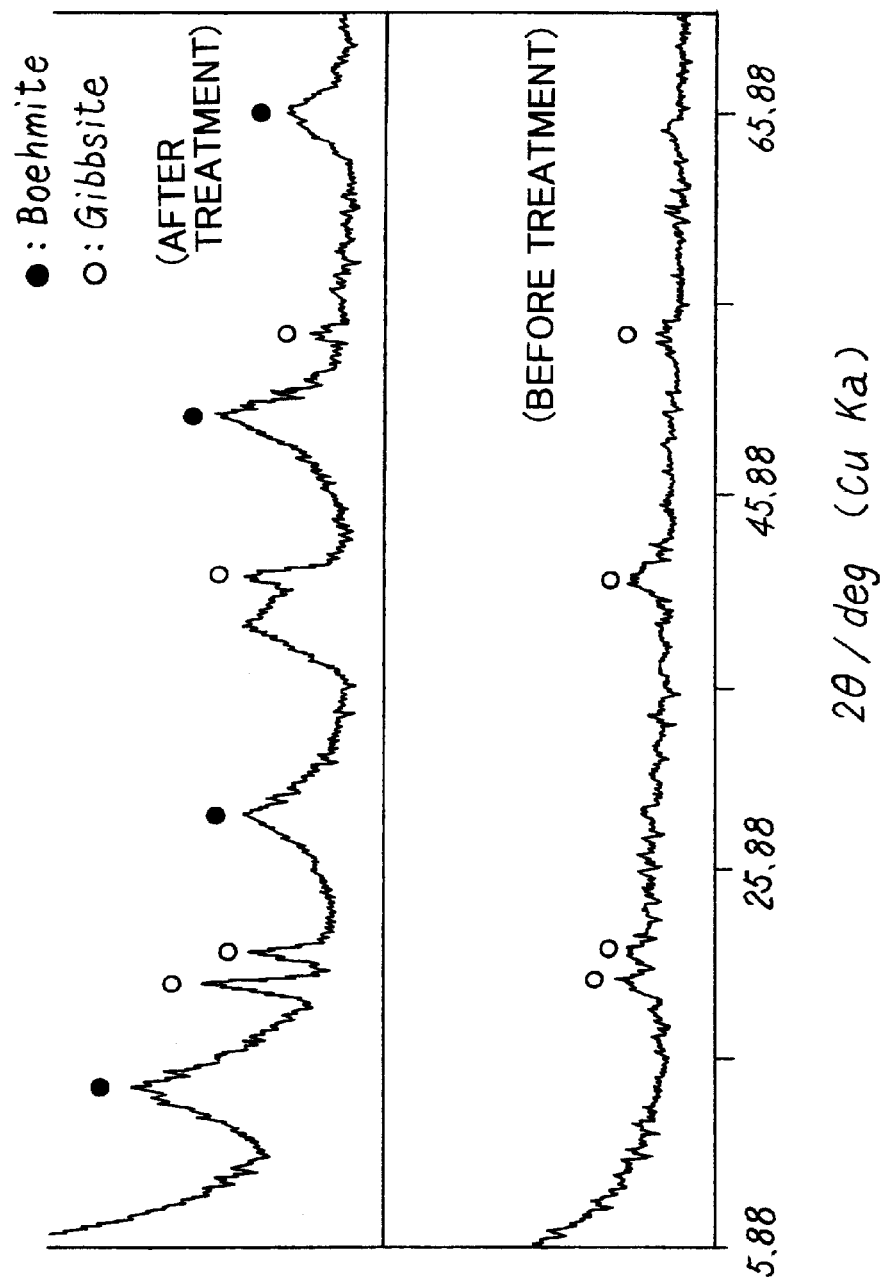
FIG. 2 shows a chart illustrating the result of analysis based on X-ray diffraction for an aluminum hydroxide sludge used as a raw material in the Examples and a dehydrated cake of pseudo-boehmite powder obtained by the maturing process, wherein solid circles indicate diffraction peaks resulting from boehmite, and open circles indicate diffraction peaks resulting from gibbsite.

An aluminum hydroxide sludge (containing 77% of water) discharged from an alumite-processing factory was prepared. The aluminum hydroxide sludge was dried at 105° C., and the composition was analyzed. As a result, it was found that the aluminum hydroxide sludge was composed of Al: 28.8% by weight, Cu: 0.15% by weight, Ni: 0.50% by weight, Fe: 0.35% by weight, Si: 0.53% by weight, and Mg: 0.35% by weight. The weight was reduced by 40.3% when the aluminum hydroxide sludge was heated to 100° C. The X-ray diffraction diagram of the aluminum hydroxide sludge is shown in a lower chart in FIG. 2. According to this chart, it is understood that few peaks are observed for the aluminum hydroxide sludge as the raw material which is poorly crystalline.

The prepared aluminum hydroxide sludge was suspended in water to prepare a slurry having a solid concentration of 3%. The slurry was heated to 80° C., and then sodium hydroxide was added thereto to adjust pH at 9. The maturing operation was effected for 5 hours in this state while performing agitation. The slurry was filtrated by using a filter press, and water was allowed to pass therethrough to wash out alkaline matters and other soluble components. Thus, a dehydrated cake was obtained.

A part of the obtained dehydrated cake was dried at 105° C., and then the crystalline structure was investigated by means of the X-ray diffraction. As shown in an X-ray diffraction chart in an upper part in FIG. 2, almost all was the boehmite phase, although peaks of the bayerite phase were partially observed. The dried dehydrated cake was treated and deaerated at 200° C., and then the specific surface area was determined in accordance with the nitrogen adsorption method (BET method). As a result, the specific surface area was 328 m$^2$/g. Thus, it was revealed that the obtained dehydrated cake was equivalent to the commercially available pseudo-boehmite powder.

ii) Production of γ-alumina

The water content of the obtained dehydrated cake of the pseudo-boehmite powder was adjusted to be 45% by using a vibrating fluidization dryer. 3300 g of the dehydrated cake was mixed and kneaded for 10 minutes while adding 100 ml of water to obtain a kneaded preparation having a water content of 55%. The kneaded preparation was shaped to have a columnar configuration having a diameter of 0.8 mm and a length of 3 to 5 mm by using an extruder. After drying the columnar product, the calcining operation was performed at 600° C. for 1 hour by using a rotary kiln to obtain a γ-alumina carrier. The γ-alumina carrier had a specific surface area of 260 m$^2$/g and a pore volume of 0.72 cc/g.

iii) Production and Evaluation of Hydrogenation Refining Catalyst

The obtained γ-alumina carrier was allowed to carry 8.0% by weight of molybdenum and 2.2% by weight of nickel to produce a catalyst for hydrogenation refining. The catalyst had a specific surface area of 230 m$^2$/g and a pore volume of 0.60 ml/g.

The obtained catalyst was subjected to a test for the desulfurization activity by using a raw material oil of Arabian light crude oil (specific gravity: 0.9608 kg/L, sulfur content: 3.32% by weight) under conditions of reaction temperatures of two points of 360° C. and 380° C., a reaction pressure of 12 MPa (hydrogen pressure), a liquid space velocity of 2.0 hr$^{-1}$, and a supply ratio (H$_2$/Oil) between the hydrogen gas and the raw material oil of 500 L/L. The obtained refined oil was analyzed for the sulfur content. As a result, the sulfur content was 0.69% by weight for the refined oil refined at 360° C. and 0.37% by weight for the refined oil refined at 380° C. These results represent the performance equivalent to the test results of the desulfurization activity of the commercially available desulfurization catalyst prepared in accordance with the same method as described above by using a raw material of a high purity pseudo-boehmite powder based on the alkoxide method (0.70% by weight for the refined oil refined at 360° C. and 0.38% by weight for the refined oil refined at 380° C.).

EXAMPLE 5

The same aluminum hydroxide sludge as that used in Example 4 was heated and dissolved at a temperature of 95° C. in a sodium hydroxide aqueous solution. Undissolved matters were removed by filtration to prepare a sodium aluminate aqueous solution. The aqueous solution had an aluminum concentration of 1 mol/L and a molar ratio of sodium/aluminum of 1.8. The same aluminum hydroxide sludge was heated and dissolved at 90° C. in a sulfuric acid aqueous solution. Undissolved matter was removed by filtration to prepare an aluminum sulfate aqueous solution having an aluminum concentration of 1 mol/L.

A neutralizing precipitation tank having an internal volume of 150 liters was added with 75 liters of water, and it was heated to 60° C. The sodium aluminate aqueous solution having been heated to 60° C. was fed thereto at a rate of about 1.8 liter/minute. Simultaneously, the aluminum sulfate aqueous solution having been heated to 60° C. was added thereto while performing agitation. During this process, the speed of addition of the solutions was finely controlled so that pH of the slurry in the precipitation tank was maintained at 9.0. The solution feed was finished at 17 minutes. The maturing operation was performed for 1 hour while performing agitation at the same temperature as described above to obtain a slurry which was filtrated so that the solid matter was washed. The solid matter was dried by using a spray dryer at inlet/outlet temperatures of 200° C./100° C. to obtain a boehmite powder. The crystalline structure of the obtained boehmite powder was investigated by means of the X-ray diffraction. The same result as that shown in the upper part in FIG. 2 was obtained. Thus, it was confirmed that the pseudo-boehmite was obtained.

The obtained pseudo-boehmite was subjected to mixing, kneading, forming, and calcination in the same manner as performed in Example 4 to obtain a catalyst carrier composed of γ-alumina. The catalyst carrier had a specific surface area of 275 m$^2$/g and a pore volume of 0.72 cc/g. The obtained catalyst carrier was allowed to carry 8.0% by weight of molybdenum and 2.2% by weight of nickel to produce a catalyst for hydrogenation refining. The catalyst had a specific surface area of 253 m$^2$/g and a pore volume of 0.62 ml/g.

A test for the desulfurization activity was carried out for the produced catalyst under the same conditions as those used in Example 4. The sulfur content of the obtained refined oil was analyzed. As a result, the sulfur content was 0.69% by weight for the refined oil refined at 360° C. and 0.37% by weight for the refined oil refined at 380° C. Thus, the results equivalent to those obtained in Example 4 were obtained.

According to the results obtained in Examples described above, it has been demonstrated that the pseudo-boehmite powder can be produced as follows. That is, the aluminum hydroxide sludge produced from the washing step in the alumite treatment is added to the alkaline waste liquid produced from the alkaline etching step in the alumite treatment as well to prepare the sodium aluminate aqueous solution, while the aluminum hydroxide sludge is added to the sulfate waste liquid produced from the anodization in the alumite treatment as well to prepare the aluminum sulfate aqueous solution, so that the prepared aqueous solutions are mixed with each other while adjusting the concentrations of the aqueous solutions. Especially, the method described in Examples is remarkable in that it uses no new aluminum material at all, and the pseudo-boehmite can be produced in the closed system based on the use of the sludge and the waste liquid produced from the alumite-processing factory. Therefore, the pseudo-boehmite, which serves as the raw material for the catalyst carrier, can be obtained as the by-product only by improving the alumite treatment site used at present.

The present invention has been specifically explained above with reference to Examples. However, the present invention is not limited to the specified methods as described above. For example, the pseudo-boehmite powder produced by the present invention can be used not only for the raw material for the catalyst for hydrogenation refining but also for the raw material for the catalyst carrier for another application or use. Further, the pseudo-boehmite powder can be used in arbitrary fields in which the γ-alumina porous material is used, for example, in the field concerning the gas-adsorbing agent. The waste liquid containing aluminum and the aluminum hydroxide sludge are not limited to those discharged from the alumite-processing factory, for which it is possible to use those discharged from arbitrary sites such as an aluminum-processing factory or an aluminum electrolytic capacitor factory.

INDUSTRIAL APPLICABILITY

According to the present invention, the catalyst carrier suitable for the hydrogenation refining catalyst can be produced by using the raw material of the aluminum source having been hitherto not utilized. Accordingly, the resource is effectively reutilized, and the catalyst carrier having the sufficient characteristics can be produced at low cost. Especially, according to the present invention, the pseudo-boehmite can be produced by using the raw materials of the alkaline waste liquid, the acidic waste liquid, and/or the aluminum hydroxide sludge produced in the alumite treatment site. Accordingly, the pseudo-boehmite can be obtained as the by-product only by improving the equipment of the alumite-processing factory. Metal components other than aluminum are contained in the acidic waste liquid produced in the alumite treatment site. The pseudo-boehmite having the quality sufficient to form the catalyst can be obtained provided that the metal components as described above are within the predetermined ranges. Further, when the pseudo-boehmite powder as described above is used, it is possible to obtain the γ-alumina carrier which has the large pore volume, which has excellent mechanical strength, and which has the large surface area.

What is claimed is:

1. A method for producing pseudo-boemite comprising:
    dissolving metal aluminum in an acidic aqueous solution to prepare an acidic aluminum aqueous solution which contains a metal component other than aluminum in a molar ratio of 0.001 to 0.02 with respect to total aluminum contained in the aqueous solution; and
    producing the pseudo-boehmite by mixing the acidic aluminum aqueous solution with an alkaline aluminum aqueous solution, the pseudo-boehmite having a specific surface area of 100–500 m$^2$/g and a pore volume of 0.4–1.8 cc/g, the pseudo-boehmite containing a non-aluminum metal selected from the group consisting of Cu, Ni, Mg, Cr, Mn, Ti, V, Zn, Zr, Be, Ga, Pb, Bi, Sn, Sb, Si, Fe and lanthanoid.

2. The method according to claim 1, wherein the alkaline aluminum aqueous solution is an aluminate aqueous solution.

3. The method according to claim 2, which further comprises:
    alkaline etching aluminum in an alumite treatment, whereby the aluminate aqueous solution is produced.

4. The method according to claim 1, which further comprises:
    anodizing aluminum in an alumite treatment, whereby the acidic aluminum aqueous solution is produced.

5. The method according to claim 1, wherein the metal component other than aluminum included at least one metal element selected from the group consisting of Cu, Ni, Mg, Cr, Mn, Ti, V, Zn, Zr, Be, Ga, Pb, Bi, Sn, Sb, Si, Fe and lanthanoid.

6. The method according to claim 1, wherein the metal aluminum is an aluminum material used for an alumite treatment.

7. A pseudo-boehmite which has a pore volume of 0.4–1.8 cc/g and contains metal components other than aluminum in a molar ratio of 0.002 to 0.02 with respect to total aluminum contained in the pseudo-boehmite, wherein the metal components other than aluminum include at least one metal element selected from the group consisting of Cu, Ni, Mg, Si and Fe.

8. The pseudo-boehmite according to claim 7, wherein a specific surface area of the pseudo-boehmite is 100 to 500 m$^2$/g as measured by a nitrogen adsorption/desorption method.

9. A method for producing a catalyst carrier, comprising calcining the pseudo-boehmite according to claim 7, at a temperature capable of obtaining γ-alumina.

10. A method for producing a hydrogenation treatment catalyst, comprising preparing a catalyst carrier by calcining the pseudo-boehmite according to claim 7, at a temperature capable of obtaining γalumina, and allowing the catalyst carrier to carry a hydrogenation-active metal.

11. The pseudo-boehmite according to claim 7 wherein the pseudo-boehmite contains iron of not more than 0.2% by weight, silicon of not more than 1.0% by weight, sodium of not more than 0.2% by weight, calcium of not more than 0.5% by weight and chlorine of not more than 500 weight ppm.

12. A method for producing pseudo-boehmite, comprising:
    dissolving metal aluminum in an alkaline aqueous solution to prepare an aluminate aqueous solution;
    dissolving metal aluminum in an acidic aqueous solution to prepare an acidic aluminum aqueous solution which contains a metal component other than aluminum in a molar ratio of 0.001 to 0.02 with respect to total aluminum contained in the aqueous solution; and
    mixing the prepared aluminate aqueous solution with the prepared acidic aluminum aqueous solution to form the pseudo-boehmite, the pseudo-boehmite having a specific surface area of 100–500 m$^2$/g and a pore volume of 0.4–1.8 cc/g, the pseudo-boehmite containing a non-aluminum metal selected from the group consisting of Cu, Ni, Mg, Cr, Mn, Ti, V, Zn, Zr, Be, Ga, Pb, Bi, Sn, Sb, Si, Fe and lanthanoid.

13. The method according to claim 12, which further comprises:
    alkaline etching aluminum in an alumite treatment, whereby the aluminate aqueous solution is produced.

14. The method according to claim 12 or 13, which further comprises:
    anodizing aluminum in an alumite treatment, whereby the acidic aluminum aqueous solution is produced.

15. A pseudo-boehmite which is produced by a method comprising:
    dissolving metal aluminum in an alkaline aqueous solution to prepare an aluminate aqueous solution;
    dissolving metal aluminum in an acidic aqueous solution to prepare an acidic aluminum aqueous solution which contains a metal component other than aluminum in a molar ratio of 0.001 to 0.02 with respect to total aluminum contained in the aqueous solution; and
    mixing the prepared aluminate aqueous solution with the prepared acidic aluminum aqueous solution to form the pseudo-boehmite, the pseudo-boehmite having a specific surface area of 100–500 m$^2$/g and a pore volume of 0.4–1.8 cc/g and wherein the metal component other than aluminum includes at least one metal element selected from the group consisting of Cu, Ni, Mg, Si, and Fe.

16. A method for making a pseudo-boehmite through aluminum or alumite treatment, comprising:
    alkaline etching the aluminum to produce an alkaline waste liquid,
    anodizing the alkaline etched aluminum to produce an acidic waste liquor; and
    producing the pseudo-boehmite by mixing the alkaline waste liquid with the acidic waste liquid, the pseudo-boehmite having a specific surface area of 100–500 m$^2$/g and a pore volume of 0.4–1.8 cc/g, the pseudo-boehmite containing a non-aluminum metal selected from the group consisting of Cu, Ni, Mg, Cr, Mn, Ti, V, Zn, Zr, Be, Ga, Pb, Bi, Sn, Sb, Si, Fe and lanthanoid.

17. The method according to claim 16, wherein the pseudo-boehmite is produced by mixing the alkaline waste liquid produced from the alkaline etching and the acidic waste liquid produced from the anodization.

18. The method according to claim 17 wherein the acidic waste liquid contains a metal component other than aluminum in a molar ratio of 0.001 to 0.02 with respect to total aluminum contained in the aqueous solution.

19. The method according to claim 18, wherein the metal component other than aluminum is at least one metal element selected from the group consisting of Cu, Ni, Mg, Cr, Mn, Ti, V, Zn, Zr, Be, Ga, Pb, Bi, Sn, Sb, Si, Fe and lanthanoid.

* * * * *

UNITED STATES PATENT AND TRADEMARK OFFICE
CERTIFICATE OF CORRECTION

PATENT NO.      : 6,429,172 B1
DATED           : August 6, 2002
INVENTOR(S)     : Takayuki Tsukada et al.

It is certified that error appears in the above-identified patent and that said Letters Patent is hereby corrected as shown below:

<u>Title page,</u>
Item [30], Foreign Application Priority Data, please change the second listed application from "Jun. 28, 1998 (JP) ..................... 10-232133"
to
　　　　　　-- Jul. 28, 1998 (JP) ..................... 10-212133 --.

Signed and Sealed this

Third Day of June, 2003

JAMES E. ROGAN
*Director of the United States Patent and Trademark Office*